United States Patent [19]
Whitney et al.

[11] 3,740,632
[45] June 19, 1973

[54] MOTOR REVERSING AND STOPPING CIRCUIT

[75] Inventors: John A. Whitney, Fort Wayne; Richard E. Woods, Markle; William H. Hohman, Bluffton, all of Ind.

[73] Assignee: Franklin Electric Co., Inc., Bluffton, Ind.

[22] Filed: Nov. 1, 1971

[21] Appl. No.: 194,744

Related U.S. Application Data

[63] Continuation-in-part of Ser. No. 72,675, Sept. 16, 1970, abandoned.

[52] U.S. Cl. ............................................. 318/289
[51] Int. Cl. ............................................. H02k 1/42
[58] Field of Search ............ 318/201–204, 207–210, 318/227, 256, 258, 261, 288–290, 373, 374

[56] References Cited
UNITED STATES PATENTS

| | | | |
|---|---|---|---|
| 3,528,103 | 9/1970 | Wolf | 318/207 |
| 2,886,756 | 5/1959 | Schaefer | 318/374 X |
| 2,509,898 | 5/1950 | Wiseman | 318/203 |
| 3,432,736 | 3/1969 | Van Emden | 318/202 |

Primary Examiner—Bernard A. Gilheany
Assistant Examiner—W. E. Duncanson, Jr.
Attorney—Axel A. Hofgren, Ernest A. Wegner and William J. Stellman et al.

[57] ABSTRACT

In an AC motor having a main winding and a start winding, a triac uncouples the start winding from AC power when the motor reaches a preselected cut-out speed. When the motor is to be decelerated, a manual switch is actuated to reversely connect the start winding, producing an instant step change in phase which actuates the triac to recouple the start winding to AC power. In one embodiment for reversing the direction of rotation, the motor decelerates through zero and immediately accelerates in the opposite direction until the cut-out speed is reached, causing the triac to again uncouple the start winding. A second embodiment, for stopping the motor, passes current for the main and start windings through a master power triac controlled by a gating circuit including a switch mounted to the rotor of the motor. As the motor decelerates to zero and just begins to accelerate in the opposite direction, the rotor mounted switch opens and deactuates the master power triac.

22 Claims, 4 Drawing Figures

Patented June 19, 1973  3,740,632

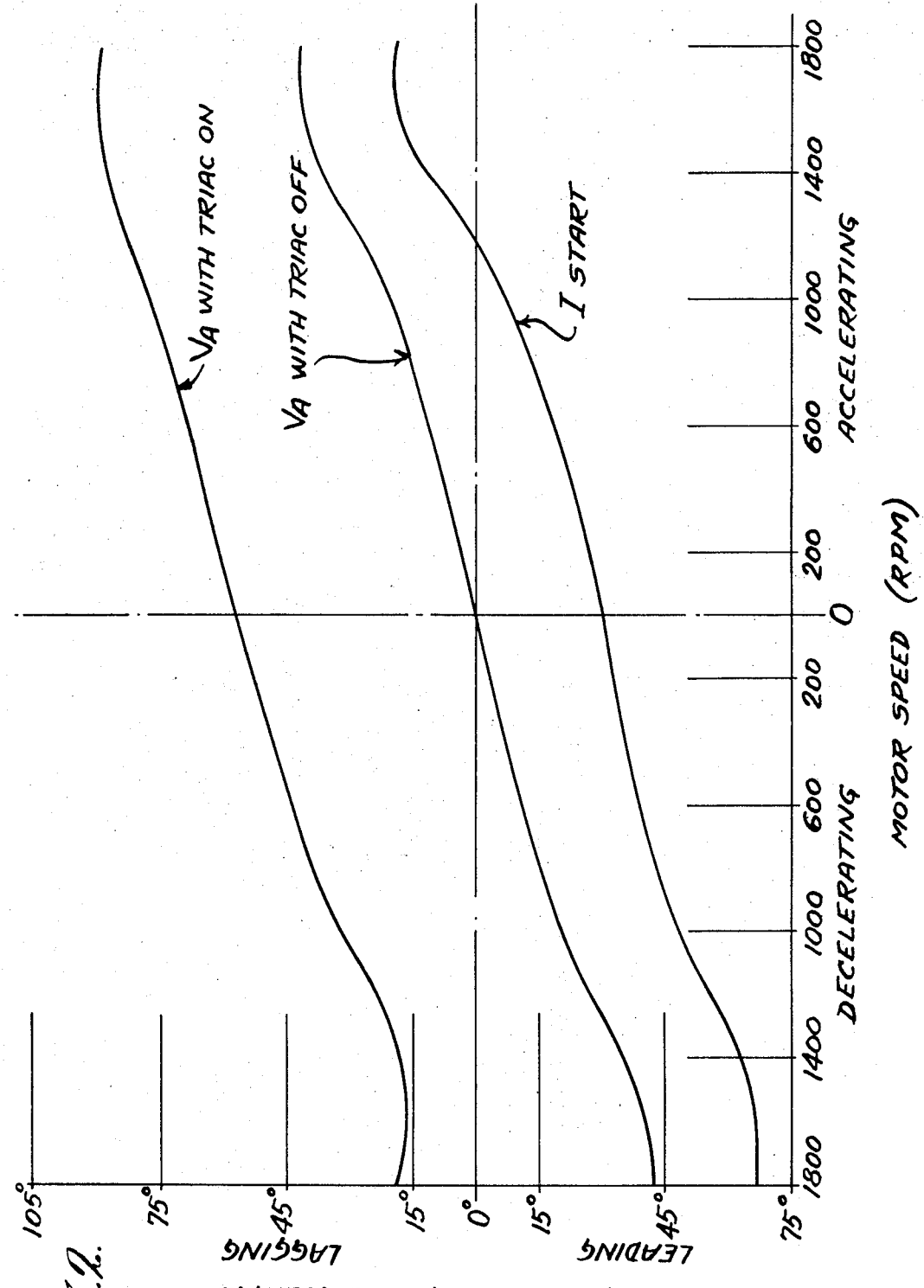

MOTOR REVERSING AND STOPPING CIRCUIT

CROSS-REFERENCE TO RELATED APPLICATIONS

This application is a continuation-in-part of our co-pending application, Ser. No. 72,675, filed Sept. 16, 1970, entitled "Switching Circuit For A Motor Start Winding," and assigned to the same assignee as the present application now abandoned in favor of Ser. No. 223,865, filed Feb. 7, 1972.

BACKGROUND OF THE INVENTION

This invention relates to circuits for reversing and stopping an AC motor.

Many AC motors use a start winding to provide starting torque during the interval from initial application of AC power until the motor approaches a running speed. After the motor accelerates beyond a predetermined cut-off speed, a start switch means in series with the start winding is disabled to effectuate more efficient operation of the motor at running speed. Prior start switch means have taken the form of a mechanical, rotor mounted centrifugal switch which opens upon reaching a cut-out speed, or a thyristor in series with the start winding and controlled by various electrical parameters in the motor circuit.

In order to reverse the direction of rotation of the motor, a reversing switch is generally provided to flip or reverse the connection of the start winding so that current can flow in an opposite or braking direction relative to rotation of the rotor. Unfortunately, the series start switch means usually is open or disabled at this time since the motor typically is at running speed. As a result, no current can flow through the start winding until the start switch means is again enabled.

Prior attempts to close the open start switch have included various combinations of one or more additional switches. For example, it has been known to connect a rotor mounted rotation sensing switch in shunt with the start switch means when a reversing switch is manually actuated. Also, an additional switch has been used to temporarily decrease current flow in the main winding so as to slow down the rotor, thereby generating a subsequent increased current flow which actuates a thyristor in series with the start winding. All such prior circuits have the disadvantage of requiring a special switch means in addition to the start winding switch and the winding reversing switch. When controlling a thyristor start winding switch, a further disadvantage is the necessity for actuating a plurality of switches in order to effect motor reversal.

In addition, no satisfactory stopping circuit using solid state components has been provided for decelerating a motor by use of dynamic plugging and then terminating motor energization upon reaching substantially zero speed. Also, it would be desirable for such a stopping circuit to overcome the disadvantages of prior reversing circuits, as discussed above. It further would be desirable to combine a reversing circuit and a stopping circuit in a single motor speed control so as to selectively provide either operation.

SUMMARY OF THE INVENTION

In accordance with the present invention, a novel circuit for decelerating an AC motor having plural windings is disclosed which overcomes the disadvantages noted above. No switches in addition to a winding reversing switch and a start winding switch are required to automatically cause an AC motor to rapidly reverse direction, decelerate to zero speed, and then accelerate in the opposite direction to running speed. In our co-pending application, Ser. No. 72,675, circuits are disclosed which control a start winding switch by sensing the relative phase difference between start winding current and applied voltage. In the present application, control by monitoring phase shifts in the motor circuit has been extended to control the reversal and stopping of an AC motor.

In a specific implementation, the change in an electrical start winding parameter when a reversal switch changes the polarity of the start winding is utilized to automatically trigger a start thyristor. Rotation sensing switches, or manually actuated switches, are not necessary to cause the motor to begin to smoothly decelerate to zero speed, and then accelerate to its running speed in the opposite direction of rotation.

When the motor is to be stopped, a modified circuit is added to the reversing circuit, without requiring any modifications to the reversing circuit. A sensing means, upon determining that the motor has just begun to accelerate in the opposite direction, disables a thyristor which passes current to both the main and start windings. The circuits are applicable to a wide variety of AC motors having plural windings, and provide greatly improved performance over prior motor reversing and stopping circuits.

One object of this invention is the provision of an improved AC motor control circuit which is responsive to a change in electrical parameter, such as phase, for enabling a previously disabled start switch to pass braking current to a motor winding.

Another object of this invention is the provision of an improved motor control circuit which requires no switches other than a winding reversal switch to initiate energization of a series start winding switch.

Yet another object of this invention is the provision of an improved dynamic braking circuit for decelerating an AC motor, and then disabling a thyristor to terminate current to the motor windings when the motor has decelerated to substantially zero speed.

Further objects and features of the invention will be apparent from the following description, and from the drawings. While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

BRIEF DESCRIPTION OF THE DRAWINGS

FIG. 2 is a plot of phase change versus motor speed for several electrical signals in the circuit of FIG. 1;

DESCRIPTION OF THE PREFERRED EMBODIMENTS

Figure 1:
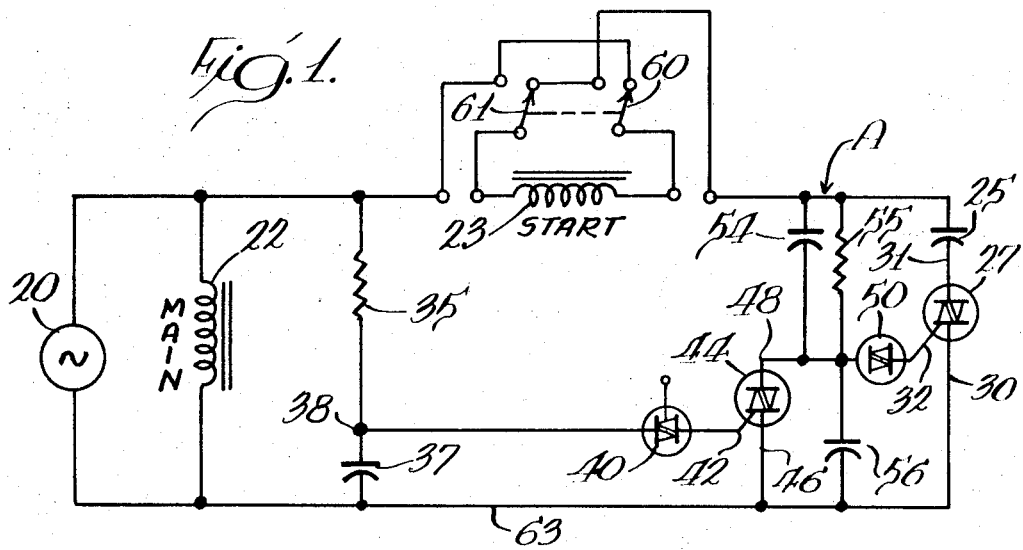
FIG. 1 is a schematic diagram of an AC motor starting and reversing circuit incorporating the invention.

Turning to FIG. 1, a circuit as illustrated in which an AC power source 20 is coupled with a main motor winding 22 of an AC motor, and with a start motor winding 23 through a series connecting start capacitor 25 and a thyristor 27. Thyristor 27 is preferably a bidirectional triode thyristor, or triac, having a main electrode or terminal 1 identified as 30, a main electrode or terminal 2 identified as 31, and a trigger or gate electrode 32 for controlling the conduction state between the terminals 30 and 31.

As is well known, a minimum value of triggering current is required at gate 32 to turn on or gate the thyristor 27 into conduction. A holding current of lesser absolute value is required to sustain conduction. Each time the value of current between the terminals 30 and 31 drops below the minimum holding current value, as when a current zero or cross-over occurs, the thyristor reverts to its nonconducting state, thereby uncoupling the start winding 23 from the AC power source 20 unless it is subsequently gated into conduction. While a triac has been illustrated, the invention is equally applicable with any controllable conduction switch means, including parallel, back-to-back connected SCRs, switching transistors, and the like.

A control circuit for gating triac 27 comprises a series connected resistor 35 and a capacitor 37, in parallel across AC source 20. A junction 38 between resistor 35 and capacitor 37 is coupled through a voltage breakdown device 40 to a gate electrode 42 of a second thyristor 44, which may be similar to thyristor 27 or may comprise other types of controllable switch means. The voltage breakdown device 40 may be a silicon bilateral switch or SBS. If higher breakover amplitudes are desired, device 40 may take the form of a DIAC, or other known breakover devices having bidirectional characteristics may be utilized.

A main electrode or terminal 1 of device 44, labeled 46, is connected in common with electrode 30 of triac 37. A main electrode or terminal 2, labeled 48, is coupled through a voltage breakdown device 50 to the gate electrode 32 of triac 27. Device 50 may comprise a DIAC, which has a higher breakover requirement than the device 40. A network comprising a paralleled capacitor 54 and resistor 55 is coupled between the junction of triac 44 and DIAC 50, and a line or junction A between the start capacitor 25 and the start winding 23. A triggering capacitor 56 shunts both main terminals of triac 44.

In order to reverse the direction of rotation of the AC motor, start winding 23 is coupled to a double-pole, double-throw (DPDT) switch having a first switch section 60, and a second switch section 61 ganged thereto. When the DPDT switch is actuated to its opposite state, the start winding 23 is flipped or electrically reversed in the series path between the AC source 23 and the start capacitor 25. As will appear, no switches in addition to the reversing switch 60, 61 are necessary to cause the AC motor to rotate in a reverse direction.

The operation of FIG. 1 is based on the relationship between the phase of the start winding current versus the applied voltage, as explained in detail in our co-pending application, Ser. No. 72,675, and as also illustrated in FIG. 2. When power is first applied, a voltage $V_A$ equal to the sum of applied voltage and start winding induced voltage appears at junction A, it being noted that the triac 27 is not yet conductive. This relationship, $V_A$ with triac off, is illustrated in FIG. 2 as the middle curve.

The portion of the control circuit including triac 44, capacitors 54 and 56, resistor 55 and DIAC 50 forms a relaxation oscillator which is immediately enabled by voltage $V_A$. The voltage $V_A$ is coupled from junction A to DIAC 50, causing breakover and thereby triggering triac 27. Current now flows through the start winding 23 and start capacitor 25, causing a voltage waveform to appear across the start capacitor with respect to a common line or reference ground 63. FIG. 2 illustrates the phase relation of start winding current $I_{START}$, and the sum voltage $V_A$ when the triac 27 is off, and the sum voltage $V_A$ when the triac 27 is on, all with respect to the applied voltage from AC source 20.

After each zero crossing of applied voltage, the resistor 35 starts to charge capacitor 37 until the breakdown voltage of the SBS 40 is reached, at which time the SBS 40 latches for the remainder of the half-cycle of applied voltage. This produces at gate electrode 42 a trigger pulse having a fixed phase angle which lags the applied voltage by an amount determined by the time constant of the phase shift network consisting of resistor 35, capacitor 37 and the breakover point of device 40. The trigger pulse gates the triac 44 into conduction, thereby shunting the relaxation oscillator to reference ground 63. This does not effect the conduction state of triac 27 at this time, but rather disables the triac triggering circuit.

As seen in FIG. 2, the start current $I_{START}$ is leading the applied voltage for low motor speeds. Hence, the start current has gone through its zero or cross-over point prior to enabling of triac 44. At the current zero or cross-over time, triac 27 turns off and causes the voltage $V_A$ to go instantly to the value of the sum of induced and applied voltage. This step change causes capacitor 54 to turn off the previously conductive triac 44, and gate DIAC 50 into conduction in order to turn on triac 27. At a later time, the device 40 is triggered and causes triac 44 to become conductive. However, this has no effect at this time since triac 27 had previously been gated into conduction. The above described operation occurs for each half-cycle of alternating current, causing the start winding 23 to effectively be connected across the AC source 20 to allow the motor to accelerate.

As the motor accelerates, the phase of the start current $I_{START}$ moves in a lagging direction with respect to applied voltage. At some intermediate speed, the phase crosses the zero degree reference point of applied voltage, and begins to lag applied voltage. As the motor reaches a cut-out speed, determined by selection of the time constants of resistor 35, capacitor 37 and resistor 55, capacitor 54, the current cross-over point will approach the fixed, lagging phase angle of the trigger pulse for triac 44. At cut-out speed, the current cross-over point occurs after the triggering of triac 44. Thus, the shunt triac 44 is conductive at the time that the relaxation oscillator attempts to become re-excited. Triac 44 shunts the triggering pulse for triac 27 (consisting of the voltage $V_A$) to reference ground 63, thus preventing the triac 27 from being enabled. The motor now continues to accelerate to its maximum running speed, with start winding 23 being disconnected from the AC source.

The circuit of FIG. 1 causes the AC motor to be essentially instantly reversed by simply actuating the reversal switch 60, 61. It will be assumed that the motor is at full or running speed, and hence the triac 27 is nonconductive and blocks current flow to the start winding, which represents the most difficult reversing problem in the prior art. When the DPDT switch 60, 61 is manually actuated, the start winding 23 is electrically reversed, creating in FIG. 2 the phase relationships shown at the left end of the three curves, namely at 1800 rpm in the decelerating direction.

It will be seen that $V_A$ with the triac off has a step change in phase, producing a phase relation similar to the initial start condition present when the motor was at rest, but considerably leading the phase angles existing at zero rpm. This leading voltage $V_A$ is coupled through capacitor 54 and enables triac 27, causing current $I_{START}$ to flow. The motor now starts to decelerate rapidly to zero, and then accelerates (in the opposite direction) until the cut-out speed is again reached. Upon reaching cut-out speed, the start switch triac 27 is disabled, as previously described.

By sensing a sudden change in any suitable electrical parameter, such as phase shift, the start winding triac can be automatically enabled as explained above, eliminating the necessity for additional manual switches, or other switch arrangements heretofore utilized in the art. The teachings of this invention are applicable to a wide variety of AC motors having plural windings. While only one start winding has been illustrated, it will be appreciated that the invention is equally applicable to AC motors having two start windings, one for rotation in one direction and the other for rotation in the opposite direction, with the switch 60, 61 being modified to place either one or the other of the start windings in the series circuit. Furthermore, while a main winding and a start winding have been illustrated, this is an arbitrary designation. Motors having phase split primary windings which are both switched to reverse the direction of rotation of an AC motor can also be utilized.

Figure 3:
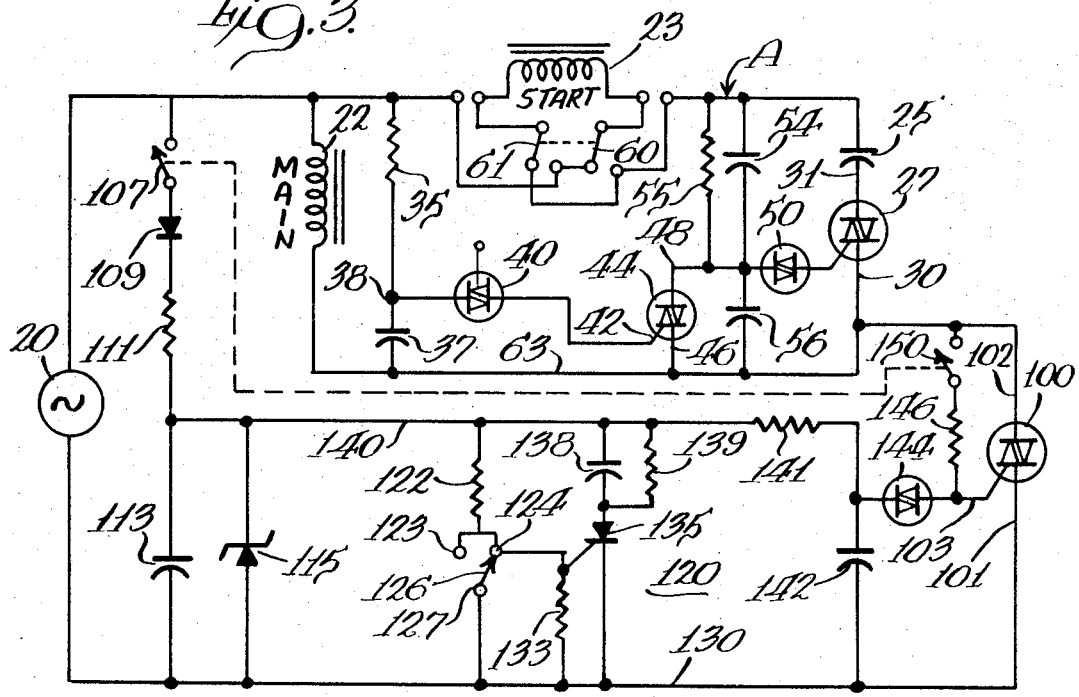
FIG. 3 is a schematic diagram of a motor starting, reversing and stopping circuit incorporating the invention.

In FIG. 3, the motor control circuit has been modified to rapidly decelerate and then stop the motor at zero speed. The decelerating circuit of FIG. 1 is located between the AC source 20 and a master power thyristor 100, which may be similar to thyristors 27 and 44. Thyristor 100 has a main electrode or terminal 1, labeled 101, a main electrode or terminal 2, labeled 102, and a gate or triggering electrode 103. Since the thyristor 100 is in series with the AC source 20, the motor control is energized only when the thyristor 100 is conductive, and is deenergized when the thyristor 100 is nonconductive.

To control thyristor 100, a series path consists of a single-pole, single-throw (SPST) switch 107, a diode 109, a resistor 111, and a capacitor 113 across AC source 20. The capacitor 113 is shunted by a Zener diode 115, having a breakover potential of 47 volts. Capacitor 113 and Zener diode 115 are shunted by a resistor 122 coupled to terminals 123 and 124 of a rotation sensing switch 126 which has a common wiper terminal 127 connected to a reference source 130, formed by a conductive line between the AC source 20 and terminal 101 of thyristor 100. A voltage developing resistor 133 is coupled between terminal 124 and reference line 130, and is coupled to the gate terminal of a thyristor 135 in the form of an SCR. The anode of SCR 135 is coupled through a paralleled capacitor 138 and resistor 139 to a line 140 connected with the junction between resistor 111 and capacitor 113. Line 140 is coupled to a relaxation oscillator 120 formed by a resistor 141 and a series capacitor 142 connected to reference line 130, and including a DIAC 144 coupled between the junction of the RC network and the gate terminal 103. The gate terminal 103 is shunted to the main terminal 102 through another triggering network, comprising a resistor 146 and a single-pole, single-throw (SPST) switch 150. Switch 150 is ganged for movement with switch 107.

Figure 4:
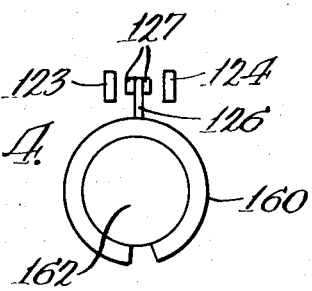
FIG. 4 is a diagrammatic illustration of a directional sensing switch mounted on a rotor shaft, which switch is used in the circuit of FIG. 3.

Rotation direction sensing switch 126 is illustrated in detail in FIG. 4. The wiper 126 is affixed to a slip-ring 160, formed of nylon, which is slipped over the end of a rotor shaft 162 of the AC motor. The end of the wiper 126 carries a pair of wiper contacts 127 which are electrically connected together. The contacts 123 and 124 are fixed terminals mounted to the frame of the motor, so as to form a single-pole, double-throw switch. As the rotor turns in one direction, the switch makes contact between the center contact 127 and one of the side contacts 123 or 124. When contact is made, the switch center contact assembly starts to slip on the rotor shaft while maintaining contact between the two terminals. This contact is maintained as long as the rotor is turning in the same direction, whether accelerating or decelerating.

When the rotor shaft 162 decelerates to zero and just starts to accelerate in the opposite direction, the wiper contact is broken and the wiper terminal 127 will move toward the opposite fixed terminal. The breaking of the previously closed contacts is used to form a signal which indicates the motor has reached substantially zero speed. The speed is not exactly zero rpm because the motor has just started to accelerate in the opposite direction. However, this acceleration is so slight as to be considered negligible.

In operation, the ganged switches 107 and 150 are closed when power is to be initially applied to the AC motor. The direction of rotation of the motor is controlled by the position of the reversing switch 60, 61. When the motor is to be reversed in direction and accelerated to full speed in the opposite direction, it is merely necessary to actuate the reversing switch 60, 61. This produces the operation previously described for FIG. 1. When it is desired to rapidly decelerate and then stop the motor, however, the ganged switches 107 and 150 are opened. Upon actuating the reversing switch, the motor is rapidly braked due to dynamic plugging action. As the motor reaches substantially zero speed, as indicated by movement of the wiper 126, the triac 100 is deenergized to thereby stop the motor.

Considering the operation of FIG. 3 in more detail, when the gang switches 107 and 150 are closed, triac 100 is turned on by triggering current through the resistor 146. At the same time, capacitor 113 is charged to the breakover potential of the Zener diode 115, such as 47 volts. This potential is coupled through line 140 to the relaxation oscillator 120. SCR 135 may, or may not, turn on depending on the initial condition of the switch 126. If the SCR 135 turns on, it will not remain latched because resistor 139 will not allow enough current to flow to latch the SCR after capacitor 138 becomes charged. After the SCR 135 turns off, resistor 139 insures that capacitor 138 will discharge.

When the reversing switch 60, 61 and the master stop switch, formed by switch sections 107 and 150, are actuated simultaneously, the motor will rapidly decelerate to zero for the same reasons previously explained for the FIG. 1 circuit. Triac 100 will remain actuated during this time, despite the opening of the triggering circuit current path through resistor 146, by means of gate pulses generated by the second triggering circuit or relaxation oscillator 120. As the motor stops and starts to turn in the opposite direction, the switch wiper 126 momentarily opens, removing the short circuit across the resistor 133.

A voltage is now impressed across resistor 133 by the previously charged capacitor 113, thereby gating SCR 135 into conduction. This in turn discharges capacitor 113 very rapidly through capacitor 138, resistor 139 and the conducting SCR 135 to a level well below the breakdown potential of the DIAC 144, thereby turning off triac 100. Since neither triggering circuit is now operating, the motor comes to rest. It should be noted that any combination of opening the reversing switch 60, 61 and the master stop switch 107, 150 will cause the above described operation. Furthermore, while a direction sensing switch 126 of the form shown in FIG. 4 has been exemplarily illustrated, other speed or direction sensing parameters, mechanical or electrical, could be utilized to provide a zero speed indication.

We claim:

1. A circuit for controlling the direction of rotation of a reversible AC motor having a plurality of windings interconnectable in one combination to cause rotation in one direction and in a different combination to cause rotation in an opposite direction, comprising:
   an AC source;
   winding switch means actuable to connect and deactuable to disconnect at least one of said windings from said AC source;
   reversal switch means having one state for interconnecting said plurality of windings in said one combination and a different state for interconnecting said plurality of windings in said different combination; and
   control means for actuating said winding switch means when said motor is first connected to said AC source and for deactuating said winding switch means when said motor reaches a cut-out speed, including
   network means effective when said motor has exceeded said cut-out speed for actuating said winding switch means in response to a change in the state of said reversal switch means to produce rapid reversal of said motor.

2. The circuit of claim 1 wherein an electrical parameter in said control means is changed in response to a change in combination of said plurality of windings, and said network means is responsive to said electrical parameter change for actuating said winding switch means.

3. The circuit of claim 2 wherein said AC source produces an alternating applied voltage, and said electrical parameter comprises the phase difference of a signal with respect to said applied voltage, said network means being responsive to a phase shift for actuating said winding switch means.

4. The circuit of claim 1 wherein said plurality of windings comprise main winding means and start winding means, means for connecting said main winding means in parallel with said AC source, said winding switch means comprises thyristor means having power terminals exhibiting conductive and nonconductive states therebetween under control of a gate signal at a gate terminal, and said control means includes series means for connecting said start winding means and said power terminals in series across said AC source, and gate control means including said network means for generating the gate signal coupled to said gate terminal for gating said thyristor means into said conductive state.

5. The circuit of claim 4 wherein said gate control means includes electrical path means in parallel with said AC source for developing a reference electrical having a phase fixed with respect to a phase of voltage from said AC source, and said network means is connected with said electrical path means and said gate terminal for controlling the state of said thyristor means in response to a relative phase difference between the phase of a start winding signal and the phase of said reference signal.

6. The circuit of claim 5 wherein said network means includes impedance means coupled between said gate terminal and a junction in said series means.

7. The circuit of claim 6 wherein said impedance means has a time constant to pass a gate signal corresponding to the voltage sum of applied voltage and induced voltage across said start winding means when said thyristor means goes nonconductive, said voltage sum having a phase changing with motor speed, and said network means includes disabling means controlled by the phase of said reference signal for disabling said gate terminal at a predetermined phase angle with respect to applied voltage.

8. The circuit of claim 7 including a start capacitor, and said series means connects said start capacitor in series between said start winding means and said thyristor means.

9. The circuit of claim 1 including sensing means for indicating when said motor has decelerated to substantially zero speed, and said control means includes stop means for deactuating said winding switching means in response to a substantially zero speed indication from said sensing means.

10. The circuit of claim 9 wherein said stop means includes thyristor means connected in series between said AC source and said plurality of windings, said sensing means causing said thyristor means to become nonconductive in response to said substantially zero speed indication.

11. In an AC motor having main winding means and start winding means each connectable with an AC source, said start winding means having one connection to cause rotation in one direction and a different connection to cause rotation in an opposite direction, a circuit for controlling and reversing the direction of rotation of the motor, comprising:
   main winding circuit means for connecting said main winding means in parallel with said AC source;
   thyristor means;
   start winding circuit means for connecting said start winding means and said thyristor means in series across said AC source to control the gating of AC power to said start winding means, including
   reversal switch means for selecting said one connection and said different connection for said start winding means to control the direction of rotation of said motor; and control means for actuating said thyristor means when said motor is below a cut-out speed and for deactuating said thyristor means when said motor exceeds said cut-out speed, including phase responsive means responsive to a change in phase in said start winding circuit means when the connection of said start winding means is changed for actuating said thyristor means.

12. The circuit of claim 11 wherein said start winding circuit means includes start capacitor means in series with said start winding means and said thyristor means.

13. The circuit of claim 11 wherein said thyristor means has power terminals exhibiting conductive and nonconductive states therebetween under control of a gate signal at a gate terminal, said start winding circuit means connects said power terminals in a series electrical path with said start winding means, and said phase responsive means includes first network means coupled between said electrical path and said gate terminal for producing said gate signal having a phase with respect to voltage from said AC source which shifts with a change in speed of said motor, said changed connection of said start winding means causing the phase of said gate signal to shift for a fixed speed of rotation of said motor.

14. The circuit of claim 13 wherein said control means includes second network means coupled to said gate terminal for effectively disabling the gate signal, including means coupled in parallel with said AC source for causing said disabling to occur at a fixed phase angle with respect to voltage from said AC source.

15. The circuit of claim 14 wherein said second network means includes shunt thyristor means actuable to shunt said gate signal from said gate terminal, and said parallel coupled means includes voltage breakdown means for enabling said shunt thyristor means after voltage from said AC source exceeds a breakover potential, thereby actuating said shunt thyristor means at a fixed phase angle which lags the voltage from said AC source.

16. In an AC motor having main winding means and start winding means each connectable with an AC source, a circuit for controlling and stopping rotation of the motor, comprising:

first thyristor means;

start winding circuit means for connecting said start winding means and said first thyristor means in series, including switch means for reversing the series connection of said start winding means;

braking control means for actuating said first thyristor means in response to said switch means reversing the series connection to pass a braking current to rapidly decelerate the motor;

sensing means for indicating when the motor has decelerated to substantially zero speed;

second thyristor means; and power circuit means for connecting at least said main winding means in series between said second thyristor means and said AC source, including stop means for deactuating said second thyristor means in response to a substantially zero speed indication from said sensing means.

17. The circuit of claim 16 wherein said power circuit means is in a series current path with both said main winding means and said start winding circuit means, and said stop means deactuates said second thyristor means to terminate current flow and thereby deactuate said first thyristor means.

18. The circuit of claim 16 wherein said braking control means includes start control means for actuating said first thyristor means when said motor is initially connected to said AC source and for disabling said first thyristor means when said motor reaches a cut-out speed, including network means effective when said motor has a speed in excess of said cut-out speed for reactuating said first thyristor means in response to said switch means reversing the series connection of said start winding means.

19. The circuit of claim 18 wherein said network means is responsive to a change in phase in said start winding circuit means for actuating said first thyristor means.

20. The circuit of claim 16 wherein said power circuit means includes first trigger means and second trigger means each capable of actuating said second thyristor means, power switch means for disabling said first trigger means when said motor is to be stopped, and said second trigger means is effective to continue actuating said second thyristor means until disabled by said stop means.

21. The circuit of claim 20 wherein said second thyristor means has power terminals exhibiting conductive and nonconductive states therebetween under control of a trigger signal at a gate terminal, said power circuit means connecting said power terminals in series with at least said main winding means, and said first trigger means connects said power switch means between one of said main terminals and said gate terminal.

22. The circuit of claim 20 wherein said second trigger means includes capacitor means for supplying an actuating signal for said second thyristor means, capacitor charge means connecting said power switch means in series between said AC source and said capacitor means to charge said capacitor means, and said stop means comprises controllable switch means in shunt with said capacitor means for discharging said capacitor means when said sensing means indicates the motor has decelerated to substantially zero speed.

* * * * *